UNITED STATES PATENT OFFICE.

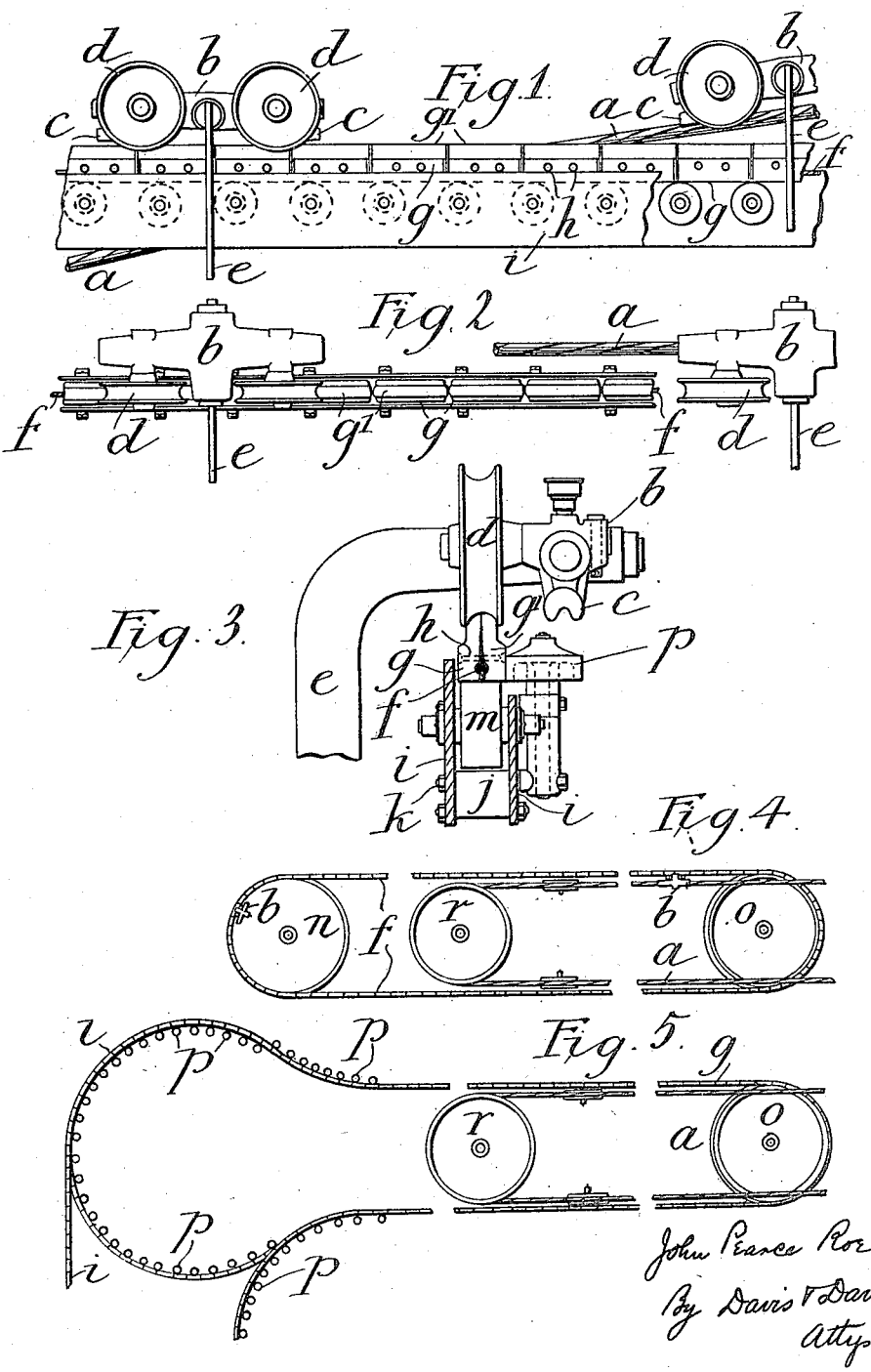

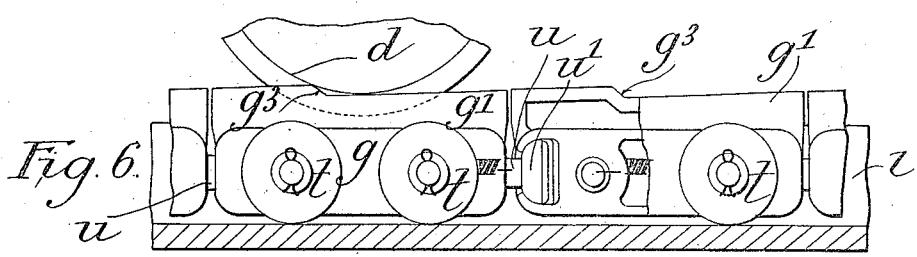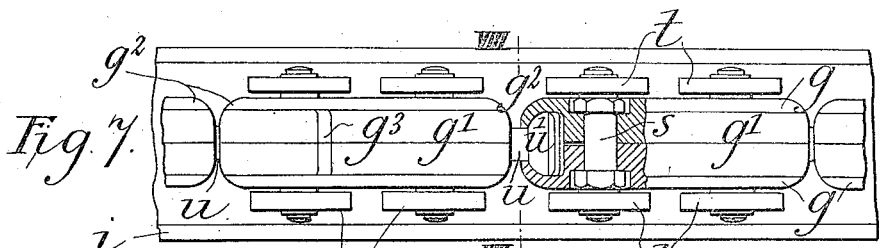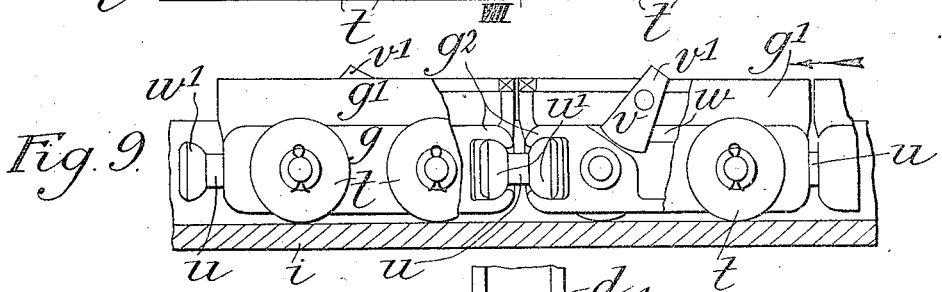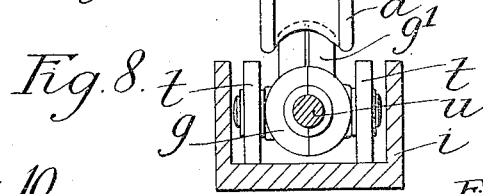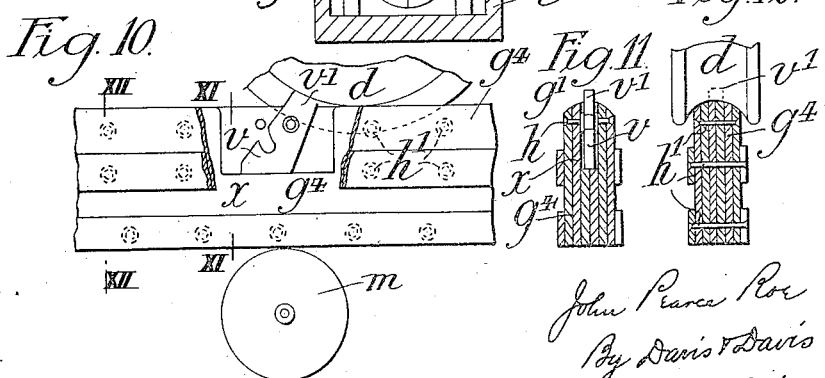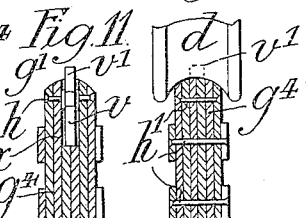

JOHN PEARCE ROE, OF LONDON, ENGLAND.

OVERHEAD CONVEYING SYSTEM FOR THE TRANSPORT OF MATERIALS.

1,407,673. Specification of Letters Patent. Patented Feb. 21, 1922.

Application filed August 22, 1921. Serial No. 494,125.

*To all whom it may concern:*

Be it known that I, JOHN PEARCE ROE, a subject of the King of Great Britain and Ireland, residing at South Place, London, England, have invented new and useful Improvements in or Relating to Overhead Conveying Systems for the Transport of Materials, of which the following is a specification.

This invention relates to overhead conveying systems for the transport of materials, embodying a moving cable and auxiliary conveying means at stations where carriers can be transferred from the moving cable to such auxiliary means and vice versa.

In the specification of my British Letters Patent No. 23538 of 1914, an arrangement of this kind is described in which either the carrier wheels, or clips, take directly on to an auxiliary running rope. According to the present invention the said carrier wheels or clips, as the case may be, do not take on to a rope but on to a flexible movable rail which may be constituted by blocks attached to a rope which moves them along, or which may be jointed together endways, so as to form a flexible movable rail, the blocks being so shaped as to permit the carrier wheels or clips to rest upon or be supported by them in such a manner that the blocks can freely pass round curves, or round the periphery of guide wheels or the like. In this way the rope itself, or other block connecting medium, is not subject to wear but only to bending, as the pressure of the carrier wheels or clips is borne by the blocks which are also so formed as to keep the carrier wheels or clips, as the case may be, free from contact with guide wheels, guides or the like.

Except where it passes over or round and is thereby supported by the periphery of a wheel, the flexible moving rail would be supported or guided where necessary by a girder or trough through which it would slide, or, alternatively, the girder or trough may be provided with rollers, so that in either case the said rail will follow any direction, curved or straight, the girder or trough is made to take.

The flexible moving rail may be constructed for example as a loop of wire rope having a series of blocks placed end to end and clamped upon the said rope by bolts, the blocks being so formed that their upper parts would constitute, in effect, a continuous rail upon which the carrier wheels would take.

Instead of a rope with blocks clamped thereto, the blocks may be threaded over the rope, or a linked chain may be used, or a chain may be used formed of rectangular blocks which may be cup-shaped at their ends to receive spherical ended connecting pieces. Alternatively, the blocks may be fixed to a flexible band or belt.

The sides and bottom surfaces of the blocks may conveniently be rectangular in cross section so that they would be capable of sustaining vertical or lateral pressure when working over or against rollers, or the sides and bottom of a trough or girder through which the blocks would slide.

Motion may be imparted to the series of rope or band connected blocks or chain links through or by the periphery of a wheel round which they pass and which may conveniently be driven by the ropeway, or be driven independently, and the said blocks or links may have teeth or indents to engage with corresponding parts on the said wheel.

A moving rail constructed in the manner indicated forms a flexible tension medium susceptible of being driven, supported and guided as described.

In lieu of the blocks moving over rollers or guides, the blocks themselves may be fitted with rollers travelling along the guide surfaces.

To cause carriers having their wheels bearing on a moving flexible rail to be propelled up an incline in the direction of travel, the rail may be serrated so as in effect to provide ratchet teeth that would be operative on the carrier wheels in one direction but not in the other; thus on a down incline in the direction of travel, the carrier wheels would be free to run over the flexible moving rail and thus allow a carrier to have a velocity in excess of the said rail, where this is desirable.

In place of serration as described, pawls pivoted in the rail blocks or links may be employed which will be operative in one direction whilst allowing the carrier wheels to freely run over them on the rail in the opposite direction.

In practice, the appliance constitutes a moving rail capable of working curves and grades, on to which the carriers of a ropeway will automatically be transferred as they leave a moving cable, and after traversing the path taken by the flexible moving rail, will automatically be again attached to a moving cable of a ropeway.

Instead of the wheels of a carrier taking upon the flexible moving rail, the clips of a carrier or other suitable part of the carrier may take on to the said moving rail.

Whilst the invention is particularly applicable to the mono-cable type of ropeway it may also be used in connection with bi-cable ropeways.

Although particular reference has been made with regard to the applicability of the invention to ropeway practice, it may be used in conjunction with other systems of conveying means and it is also obvious that without departing from the nature of the invention, it can be modified in detail to suit varied requirements.

In the accompanying illustrative drawings, Figs. 1 and 2 show respectively in side elevation and plan, a portion of one construction of an overhead conveying system embodying the invention. Fig. 3 is a cross section, to a larger scale than Figs. 1 and 2, of such a system taken through a curved portion of a stationary girder or trough. Figs. 4 and 5 show diagrammatically in plan, two arrangements of such a system. Fig. 6 shows in sectional side elevation, Fig. 7 in sectional plan on the line VII—VII of Fig. 6 and Fig. 8 in cross section on the line VIII—VIII of Fig. 7, another construction of flexible movable rail and girder or guide therefor. Fig. 9 is a similar view to Fig. 6, showing another modification. Fig. 10 shows in sectional side elevation a further construction of flexible movable rail and Figs. 11 and 12 are cross sections of the rail on the lines XI—XI and XII—XII of Fig. 10.

Referring to Figs. 1, 2 and 3, $a$ is the moving cable of a ropeway and $b$ an ordinary carrier provided with clips $c$ to engage the cable, with wheels $d$ that usually take on to a shunt rail when the clips leave the cable at stations, bunkers and similar turn out places associated with the ropeway and with a hanger $e$ from which a bucket or equivalent is suspended in the usual manner.

In this example, the flexible movable rail comprises a loop of wire rope $f$ and a series of pairs of metal blocks $g$ placed end to end and clamped on the rope, as by bolts or rivets $h$, the upper ends of the blocks being adapted, as shown more clearly in Fig. 3, to form, in effect, a continuous rail $g^1$ upon which the carrier wheels $d$ can take, when required. In this example, the stationary trough or girder for supporting or guiding the flexible movable rail is built up of vertical side plates $i$ spaced apart by distance pieces $j$ and connected together by bolts $k$, rollers $m$ being mounted between and carried by the side plates to support the flexible movable rail, the blocks $g$ of which have flat sides and bottoms to admit of their moving freely through the trough or guide and over the rollers $m$.

Where the flexible rail passes around sheaves $n$ and $o$, as shown, in Fig. 4, a trough or girder need only be provided for the straight portions of the flexible rail, the curved end portions of the flexible rail being supported by the peripheries of the sheaves suitably shaped for the purpose. Where the flexible rail is arranged to follow a curved path other than that arranged for by passing round sheaves such as $n$ or $o$, the trough or guide is made of the required curved shape as seen in plan and provided with a series of side rollers $p$ (Figs. 3 and 5) to support the flexible rail laterally in one or the other direction and impart thereto the required curvature at such parts of the trough or guide. Fig. 3 shows how such side rollers $p$ can be mounted. $r$ in Figs. 4 and 5 is one of the terminal sheaves for the moving cable $a$ of the ropeway. Motion may be imparted to the flexible movable rail by say the sheave $o$, suitably driven from a moving part of the ropeway, or it may be driven independently.

In the example shown in Figs. 6, 7 and 8, the flexible movable rail is built up of pairs of blocks $g$, the blocks of each pair being connected together by bolts $s$ provided at their outer ends with supporting rollers $t$ and the adjacent pairs of blocks having cup shaped ends $g^2$ to receive the spherical ends $u^1$ of connecting links $u$ by which the blocks are flexibly connected together. In this example the staionary trough or guide $i$ is shown as of channel form in section, the rollers $t$ running on the bottom thereof.

In Figs. 6, 7 and 8, the upper rail portions $g^1$ of the blocks $g$ are shown serrated so as in effect to provide a ratchet formation $g^3$ to prevent relative movement of the carrier wheels $d$ in one direction, as when ascending an incline, so as to force the carrier to move up the incline, but which will allow the said wheels and carrier to move freely in the opposite direction, as when descending an incline.

Fig. 9 shows a modification wherein each of the blocks $g$ has pivoted therein a pawl $v$ that is supported in the position shown by a stop $w$ so that it cannot turn into a lower position, in order that its upper free end $v^1$ will serve as an abutment or stop to prevent a carrier wheel $d$ overrunning it in the direction of the arrow, as when ascending an incline, but can be depressed by the wheels on a carrier, when the carrier is descending an incline.

In Figs. 10, 11 and 12, the flexible movable rail is built up of a number of strips $g^4$ of leather or metal or other suitable material, secured together sideways, as by rivets $h^1$, the rail so formed being flat at its underside to work over supporting rollers $m$ carried by a trough or guide, and adapted at its upper end $g^1$ to accommodate the carrier wheels $d$. In this case, pawls $v$, $v^1$ are mounted to turn in recesses $x$ left in the rail after the manner and for the same purpose as the pawls $v$, $v^1$ shown in Fig. 9.

What I claim is:—

1. In an overhead conveying system, a flexible movable rail on to which the wheels or clips of a carrier can automatically take at stations, bunkers and similar turn out places associated with the overhead conveying system, and a stationary girder, trough or guide arranged to follow any desired direction or path and adapted to support the flexible movable rail, substantially as described.

2. An overhead conveying system according to the preceding claim, wherein the flexible movable rail is constituted by a rope, band or belt and a series of blocks placed end to end and fixed to the rope, band or belt, the upper end of the blocks being adapted to constitute in effect a continuous rail upon which the carrier wheels can take, substantially as described.

3. An overhead conveying system according to claim 1, wherein the flexible movable rail is constituted by a linked chain, substantially as described.

4. An overhead conveying system according to claim 1, wherein the flexible movable rail is constituted by blocks connected together end to end by links jointed to the blocks, substantially as described.

5. An overhead conveying system according to claim 1, wherein the flexible movable rail is constituted by a number of flexible bands or strips of metal, leather or other suitable material secured together laterally, substantially as described.

6. An overhead conveying system according to claim 1, wherein the stationary girder, trough or guide is provided with rollers adapted to directly support the flexible movable rail, substantially as described.

7. An overhead conveying system according to claim 1, wherein the stationary girder, trough or guide is provided with side rollers where necessary, for taking lateral pressure of the flexible movable rail, substantially as described.

8. An overhead conveying system according to claim 1, wherein the flexible movable rail is provided with rollers adapted to run on a stationary girder, trough or guide adapted to support them, substantially as described.

9. An overhead conveying system according to claim 1, wherein the flexible movable rail is adapted to prevent the carrier supported thereby moving endways thereon in one direction whilst permitting it to move freely in the opposite endways direction, substantially as described for the purposes set forth.

10. In an overhead conveying system according to claim 1, the combination with the flexible movable rail of a number of pawls pivoted thereto, each adapted to prevent a carrier supported by said rail from moving in one direction on said rail whilst permitting it to move freely in the opposite direction on said rail, substantially as described for the purpose set forth.

11. In an overhead conveying system, the combination of a flexible movable rail and stationary girder, trough or guide according to any of the preceding claims with an overhead cable ropeway system, substantially as hereinbefore described with reference to Figs. 1 to 5 inclusive of the accompanying drawings.

Signed at London, England, this 12th day of August, 1921.

JOHN PEARCE ROE.